United States Patent
Mori

(10) Patent No.: US 8,220,867 B2
(45) Date of Patent: Jul. 17, 2012

(54) VEHICLE BODY SIDE STRUCTURE

(75) Inventor: Takeo Mori, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/125,905

(22) PCT Filed: Dec. 8, 2008

(86) PCT No.: PCT/JP2008/072273
§ 371 (c)(1),
(2), (4) Date: Apr. 25, 2011

(87) PCT Pub. No.: WO2010/067411
PCT Pub. Date: Jun. 17, 2010

(65) Prior Publication Data
US 2011/0254320 A1     Oct. 20, 2011

(51) Int. Cl.
*B62D 25/00* (2006.01)
*B62D 25/20* (2006.01)

(52) U.S. Cl. ............... 296/209; 296/187.08; 296/187.12; 296/203.03

(58) Field of Classification Search ............. 296/187.08, 296/187.12, 193.05, 193.07, 203.03, 209
See application file for complete search history.

(56) References Cited

U.S. PATENT DOCUMENTS 6,761,394 B2 *   7/2004   Gennai et al. ............. 296/203.01
7,520,563 B1 *   4/2009   An et al. ........................ 296/204
2006/0001294 A1 *  1/2006  Balgaard et al. .............. 296/209
2010/0140977 A1 *  6/2010  Mori ......................... 296/193.07
2011/0285175 A1 * 11/2011  Imamura .................. 296/193.05

FOREIGN PATENT DOCUMENTS

JP   A-02-096375     4/1990
JP   A-05-286457    11/1993
JP   A-2008-137589   6/2008

OTHER PUBLICATIONS

International Search Report issued in Application No. PCT/JP2008/072273; Dated Mar. 10, 2009 (With Translation).
International Preliminary Report on Patentability cited in International Application No. PCT/JP2008/072273 dated Jun. 16, 2011.

* cited by examiner

*Primary Examiner* — Jason S Morrow
(74) *Attorney, Agent, or Firm* — Oliff & Berridge, PLC

(57) ABSTRACT

A rocker includes a lower wall portion, which is an inclined surface inclined downward toward the inside of a vehicle body, on the lower surface of the rocker, and a floor panel is bonded to the lower wall portion. Accordingly, when an in-plane tensile force is applied to the floor panel the in-plane tensile force is applied not in a direction where the bonding between the rocker and the floor panel is separated but in a direction where the bonding between the rocker and the floor panel is shorn. As a result, it may be possible to improve bonding strength. Further, a corner portion is formed at the end portion of the inclined surface facing the floor panel, and a frictional force is generated at the corner portion between the floor panel and the rocker. Therefore, a load, which is applied to the floor panel, can be distributed to the rocker. Due to these operations, reinforcing members and the like do not need to be provided, and it may be possible to improve the bonding strength between the rocker and the floor panel.

5 Claims, 16 Drawing Sheets

Related Art

Related Art

VEHICLE BODY SIDE STRUCTURE

TECHNICAL FIELD

The present invention relates to a vehicle body side structure, and more particularly, to a vehicle body side structure where a rocker (side sill) is provided at a lower portion of a vehicle body.

BACKGROUND ART

In general, a rocker (side sill), which extends in a longitudinal direction and has a hollow closed cross-section, is provided at a lower portion of a vehicle body, and both side portions of a floor panel, a lower portion of a center pillar, and the like are connected to the rocker. As a vehicle body side structure that includes this kind of rocker, a structure where both ends of a floor panel are curved upward along the side surface of a rocker so as to form flanges and the flanges are bonded to the side surface of the rocker is disclosed in, for example, Patent Literature 1.

CITATION LIST

Patent Literature

[Patent Literature 1] Japanese Unexamined Patent Application Publication No. 2008-137589

SUMMARY OF INVENTION

Technical Problem

However, when an external force is applied to a vehicle body and an in-plane tensile force is applied to the floor panel, the in-plane tensile force is parallel to a separation direction where the floor panel is separated from the rocker in the above-mentioned technique. For this reason, a countermeasure to increase the bonding strength between the rocker and the floor panel, such as the installation of various reinforcing members, is complicated. That is, a part of a load, which is applied to the floor panel in the front and rear methods, is transmitted to the rocker. However, if the bonding strength such as the welding strength between the rocker and the floor panel is not sufficient, reinforcing members are needed. For this reason, an increase in weight and cost is caused.

The invention has been made in consideration of the above-mentioned circumstances, and an object of the invention is to provide a vehicle body side structure that does not need to be provided with reinforcing members and the like and improves the bonding strength between a rocker and a floor panel.

Solution to Problem

According to the invention, there is provided a vehicle body side structure where a rocker extending in a longitudinal direction of a vehicle body is provided at a lower portion of the vehicle body and a floor panel is bonded to the rocker. The rocker includes an inclined surface, which is inclined downward toward the inside of the vehicle body, on the lower surface of the rocker, and the floor panel is bonded to the inclined surface and positioned below the inclined surface.

According to this structure, the rocker includes the inclined surface, which is inclined downward toward the inside of the vehicle body, on the lower surface of the rocker and the floor panel is bonded to the inclined surface. Accordingly, when an in-plane tensile force is applied to the floor panel, the in-plane tensile force is applied not in a direction where the bonding between the rocker and the floor panel is separated but in a direction where the bonding between the rocker and the floor panel is shorn. As a result, it may be possible to improve bonding strength. Further, since the rocker includes the inclined surface, which is inclined downward toward the inside of the vehicle body, on the lower surface of the rocker and the floor panel is bonded to the inclined surface and positioned below the inclined surface, a corner portion is formed at the end portion of the inclined surface facing the floor panel and a frictional force is generated at the corner portion between the floor panel and the rocker. Therefore, a load, which is applied to the floor panel, can be distributed to the rocker. Due to these operations, reinforcing members and the like do not need to be provided, and it may be possible to improve the bonding strength between the rocker and the floor panel.

In this case, it is preferable that a bonding point between the floor panel and the inclined surface be positioned above an end portion of the inclined surface facing the inside of the vehicle body.

According to this structure, the bonding point between the floor panel and the inclined surface is positioned above an end portion of the inclined surface facing the inside of the vehicle body. Accordingly, a load, which has been distributed to the rocker, is applied to the bonding point due to a frictional force that is generated at the corner portion of the end portion of the inclined surface facing the floor panel. Therefore, it may be possible to reduce the load to be applied to the bonding point.

Meanwhile, it is preferable that the inclined surface include a protruding portion protruding downward.

According to this structure, the inclined surface includes a protruding portion protruding downward. Accordingly, a frictional force is generated at the protruding portion between the floor panel and the rocker, so that a load applied to the floor panel can be further distributed to the rocker.

In this case, it is preferable that the protruding portion be positioned at an end portion of the inclined surface facing the inside of the vehicle body. According to this structure, the protruding portion is positioned at the end portion of the inclined surface facing the inside of the vehicle body. Accordingly, a frictional force is generated at the protruding portion between the floor panel and the rocker, so that it may be possible to improve the effect of distributing a load, which is applied to the floor panel, to the rocker.

Meanwhile, according to the invention, there is provided a vehicle body side structure where a rocker extending in a longitudinal direction of a vehicle body is provided at a lower portion of the vehicle body and a floor panel is bonded to the rocker. The floor panel is bonded to the lower surface of the rocker and positioned below the rocker, and includes a bonding point between the rocker and the floor panel, a contact surface that comes into contact with the lower surface of the rocker on the inner side of the vehicle body than the bonding point, and a contact surface-terminal portion where the contact between the contact surface and the lower surface of the rocker is separated on the inner side of the vehicle body than the contact surface. The contact surface includes a portion that is positioned below both the bonding point and the contact-terminal portion.

Advantageous Effects of Invention

According to the vehicle body side structure of the invention, reinforcing members and the like do not need to be

Figure 1:
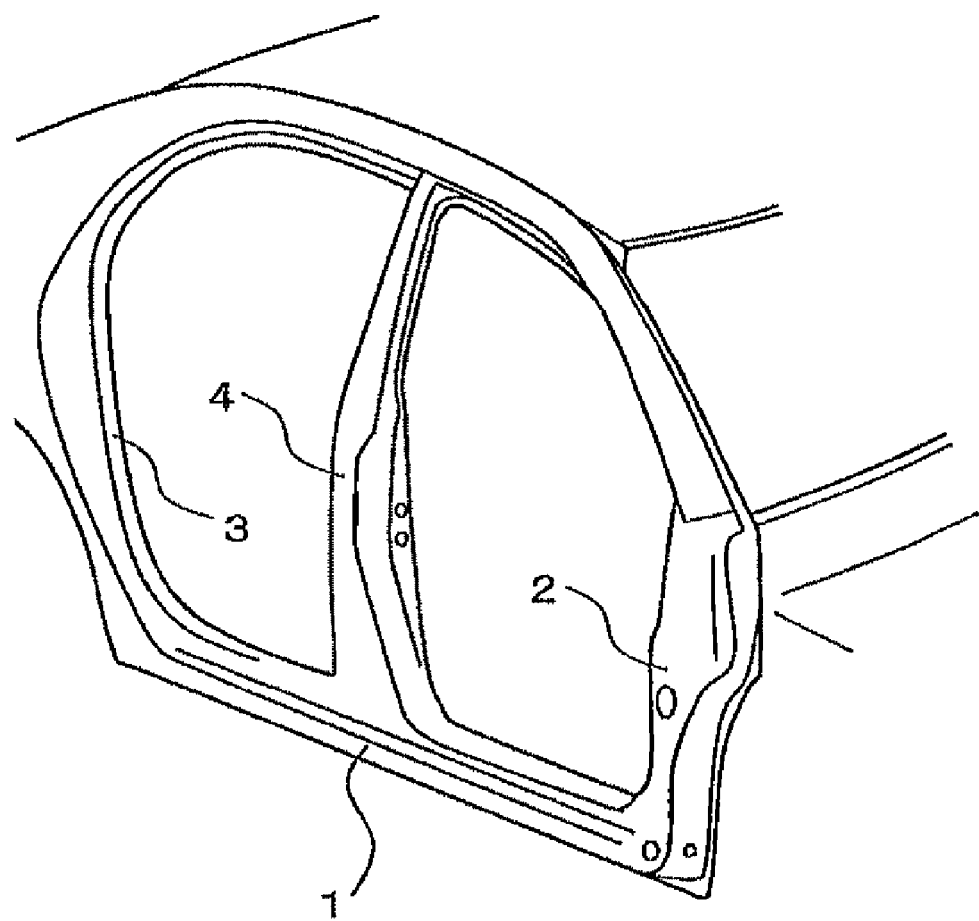
FIG. 1 is a perspective view showing the appearance of a vehicle body side structure according to a first embodiment.

DESCRIPTION OF REFERENCE SIGNS 1, 1', 10: rocker
1A: rocker inner
1B: rocker outer
1C: upper bonding piece
1D: lower bonding piece
1E: upper bonding piece
1F: lower bonding piece
1G: lower wall portion
1H: bonding point
1I: protruding portion
2: front pillar
3: rear pillar
4: center pillar
20: floor panel
21: wrinkle
30: floor-under-reinforcement
40: reinforcing member
50: reinforcing member

DESCRIPTION OF EMBODIMENTS

Vehicle body side structures according to embodiments of the invention will be described below with reference to the drawings. Among the drawings, FIG. 1 is a perspective view showing the appearance of a vehicle body side structure according to an embodiment and FIG. 2 is a partial perspective view of a rocker shown in FIG. 1.

As shown in FIG. 1, a vehicle body side structure according to the embodiment includes a rocker (side sill) 1 that is disposed at the lower portion of a vehicle body and extends in a longitudinal direction of the vehicle body. The lower end portion of a front pillar 2 is connected to the front end portion of the rocker 1, and the lower end portion of a rear pillar 3 is connected to the rear end portion of the rocker. The lower end portion of a center pillar 4 is connected to the middle portion of the rocker 1 in the longitudinal direction of the rocker.

Figure 2:
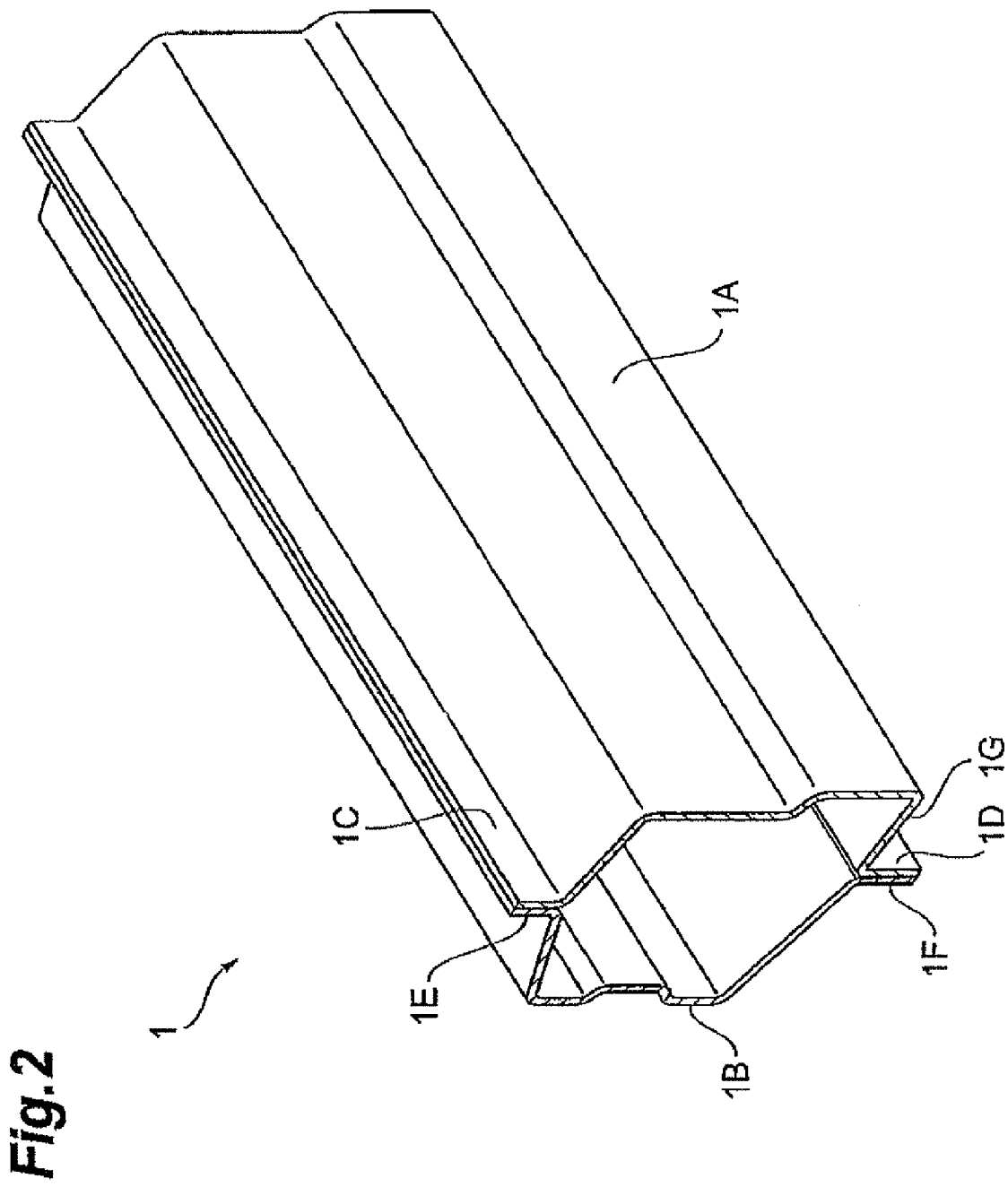
FIG. 2 is a partial perspective view of a rocker shown in FIG. 1.

The front surfaces of a rocker inner 1A and a rocker outer 1B, which are respectively formed substantially in the shape of a hat, come into contact with each other as shown in FIG. 2 and the rocker inner and the rocker outer are welded to each other, so that the rocker 1 is formed so that a hollow closed cross-section is formed between the rocker inner and the rocker outer. As bonding portions for welding, upper and lower bonding pieces 1C and 1D are formed at the rocker inner 1A and upper and lower bonding pieces 1E and 1F are formed at the rocker outer 1B.

Figure 3:
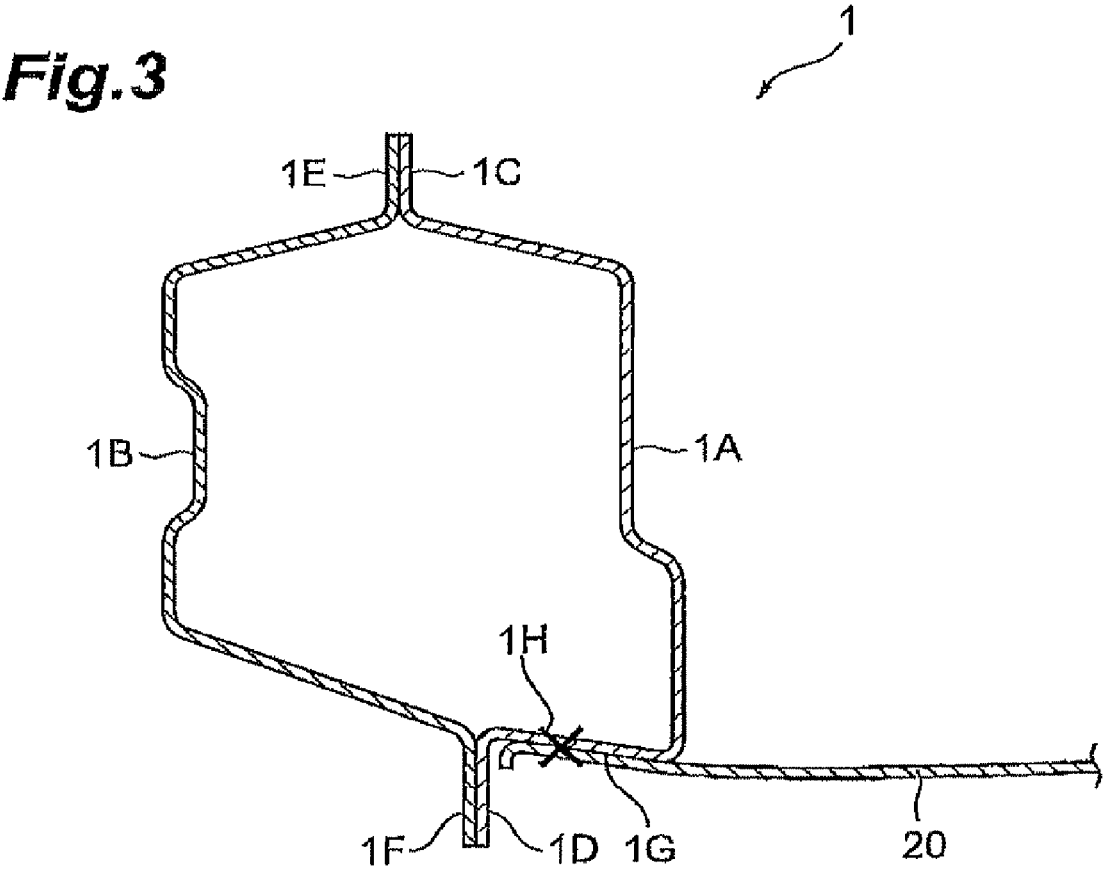
FIG. 3 is a longitudinal sectional view illustrating the bonding between a floor panel and a rocker according to the first embodiment.
Figure 4:
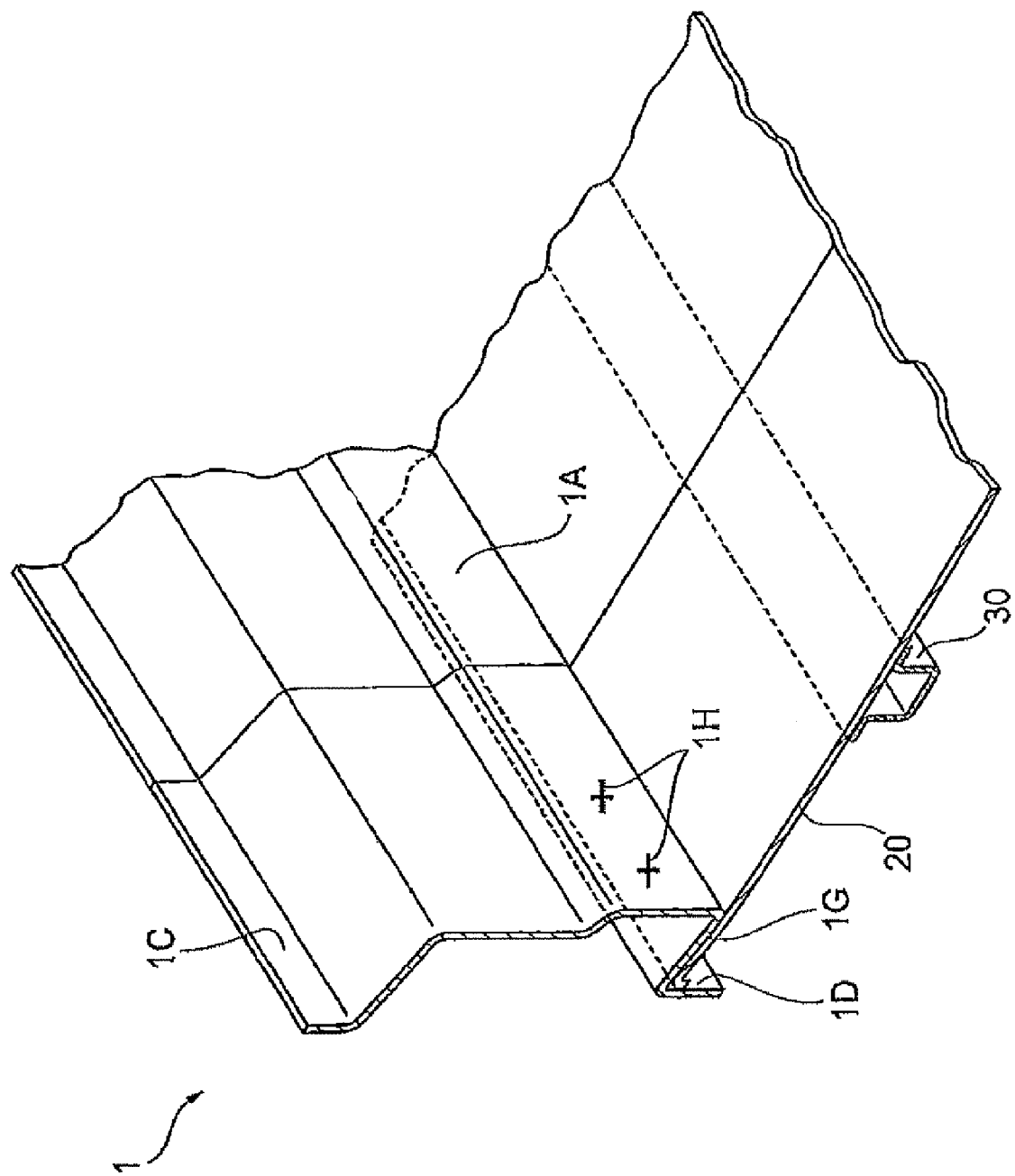
FIG. 4 is a perspective view illustrating the bonding between the rocker and the floor panel shown in FIG. 3.

FIG. 3 is a longitudinal sectional view illustrating the bonding between the rocker 1 and a floor panel 20 according to the first embodiment, and FIG. 4 is a perspective view illustrating the bonding between the rocker 1 and the floor panel 20 shown in FIG. 3. As shown in FIGS. 3 and 4, a lower wall portion 1G of the rocker inner 1A of the rocker 1 forms an inclined surface that is inclined downward toward the inside of the vehicle body. The inclination angle of the lower wall portion 1G, which is inclined downward, is preferably in the range of, for example, 3 to 7° and more preferably in the range of 4 to 6°.

The floor panel 20 is bonded to the lower wall portion 1G at a bonding point 1H by laser welding or adhesion along the outer wall surface of the lower wall portion 1G. As shown in FIG. 4, a floor-under-reinforcement 30 as a reinforcing member is bonded to the lower surface of the floor panel 20 by laser welding or adhesion.

Figure 5:
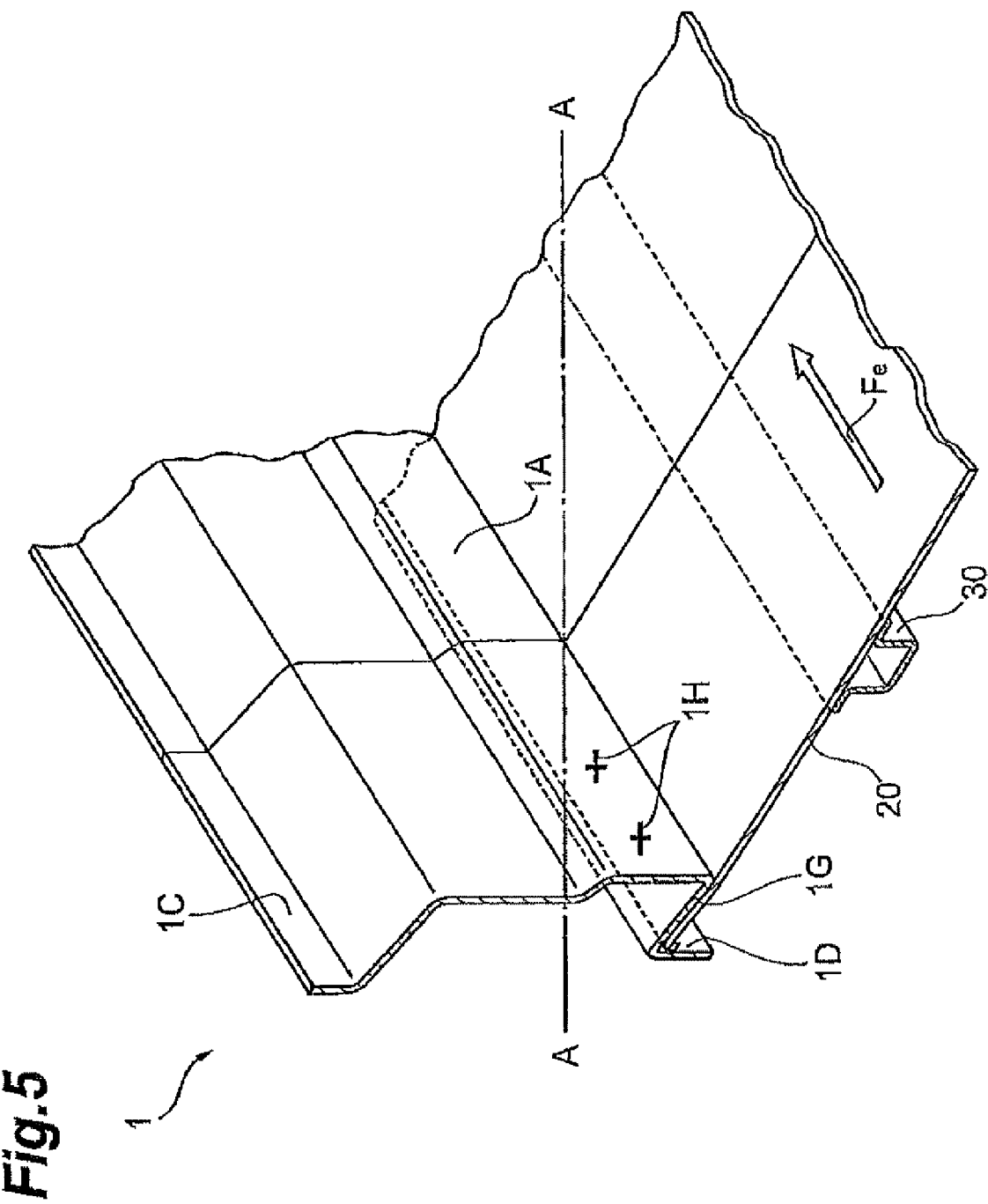
FIG. 5 is a perspective view illustrating a force applied to each portion when an external force is applied to the rocker and the floor panel shown in FIG. 3.
Figure 6:
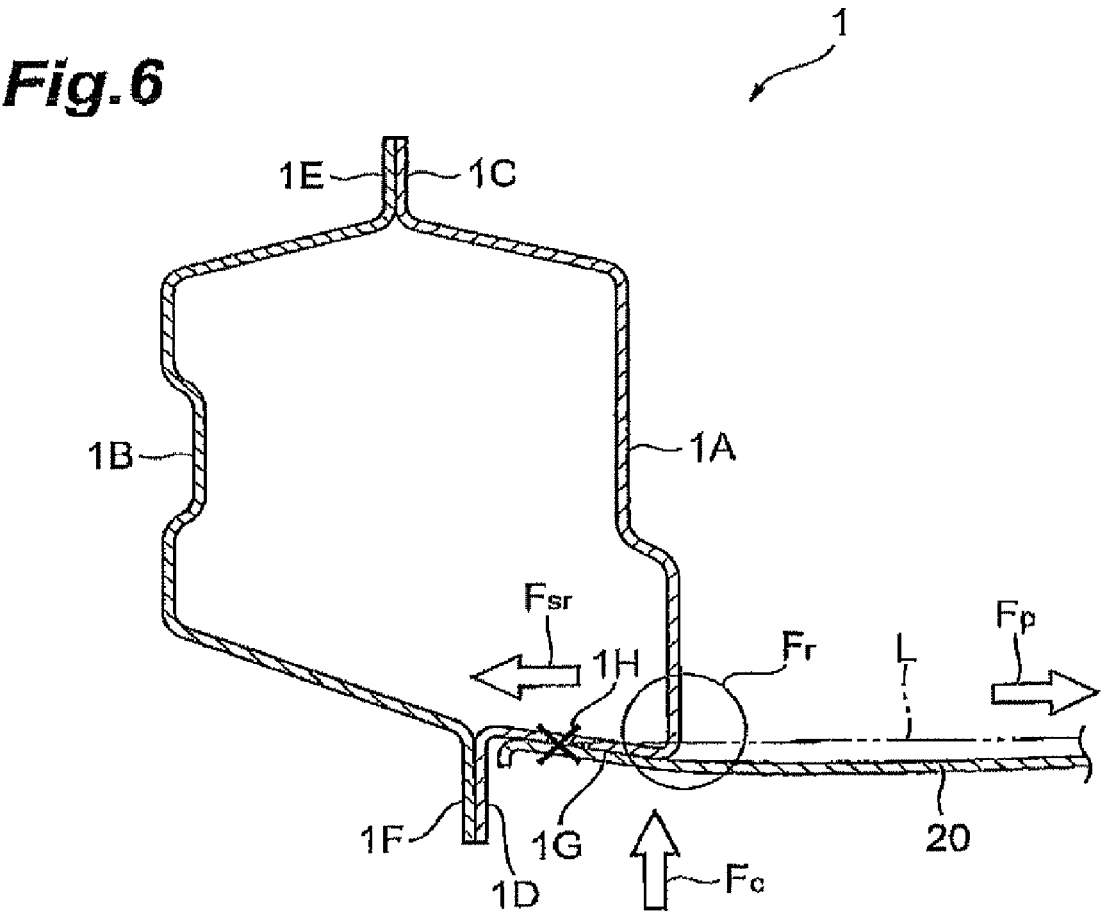
FIG. 6 is a longitudinal sectional view illustrating forces applied to the respective portions when an external force is applied to the rocker and the floor panel shown in FIG. 3.

The operation of the vehicle body side structure will be described below. FIG. 5 is a perspective view illustrating a force applied to each part when an external force is applied to the rocker 1 and the floor panel 20 shown in FIG. 3, and FIG. 6 is a longitudinal sectional view illustrating forces applied to the respective parts when an external force is applied to the rocker 1 and the floor panel 20 shown in FIG. 3. FIG. 6 shows forces, which are applied to the respective portions in the cross-section taken along a line A-A of FIG. 5 (the cross-section of the floor panel 20 taken in the direction of a displacement line of the floor panel 20) when a floor input Fe is applied to the floor panel 20 as shown in FIG. 5.

When a floor in-plane tensile force Fp is applied to the floor panel 20 as shown in FIG. 6, the floor panel 20 is deformed along a floor panel-deformation line L and a shear direction-reaction force Fsr is applied in a direction parallel to the outer wall surface of the lower wall portion 1G. Further, a rocker compressing force Fc is applied to a frictional force generating portion Fr that is formed at a corner portion between the lower wall portion 1G and the side wall of the rocker inner 1A.

Figure 7:
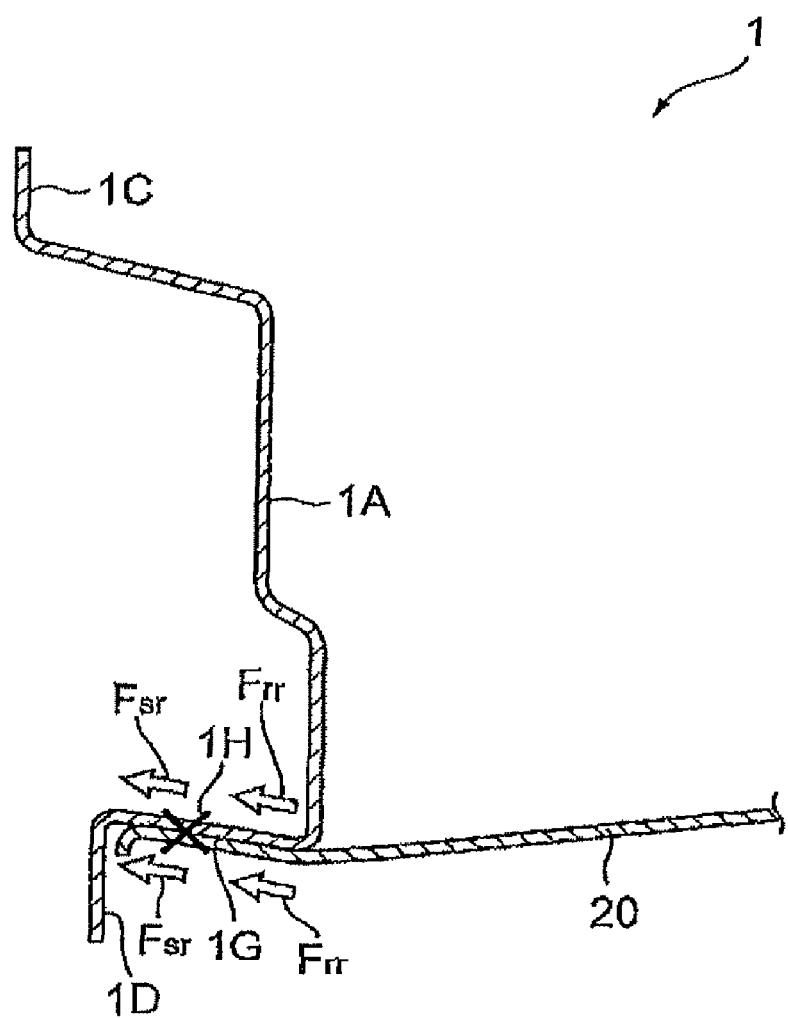
FIG. 7 is a longitudinal sectional view illustrating forces that are applied in a direction parallel to the lower surface of the rocker shown in FIG. 3.
Figure 8:
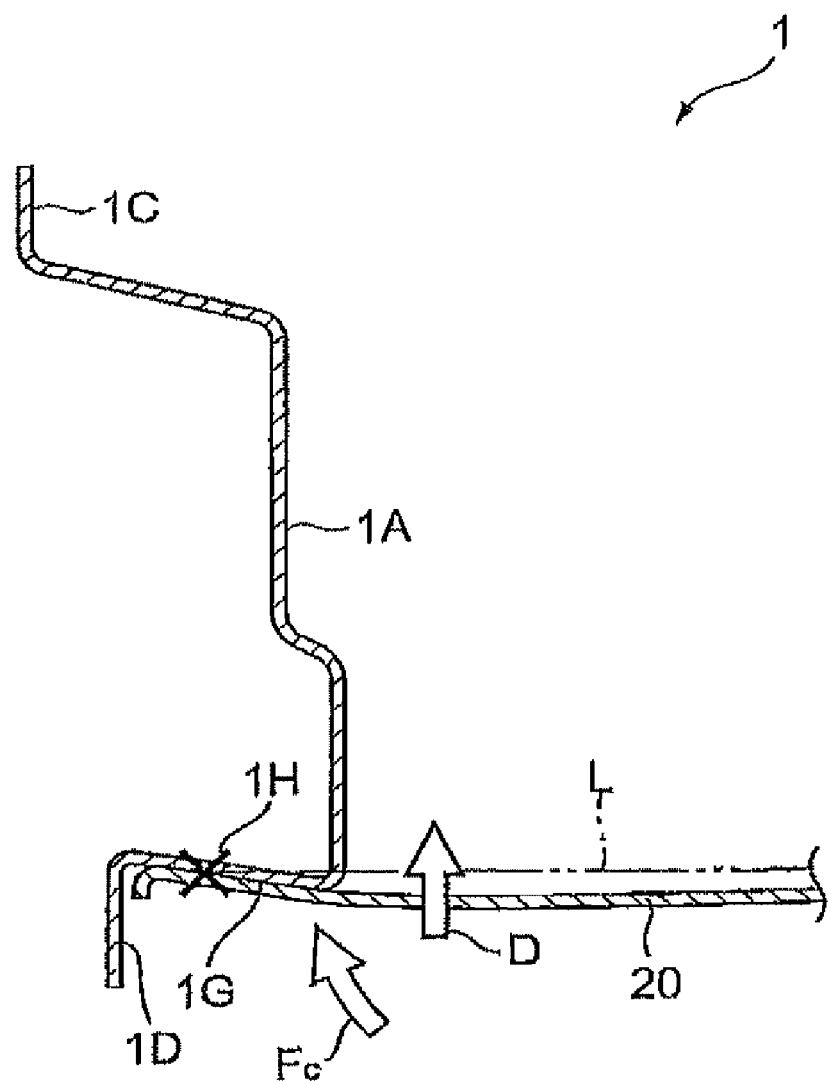
FIG. 8 is a longitudinal sectional view illustrating forces that are applied in a direction perpendicular to the lower surface of the rocker shown in FIG. 3.

FIG. 7 is a longitudinal sectional view illustrating forces that are applied in a direction parallel to the lower surface of the rocker shown in FIG. 3, and FIG. 8 is a longitudinal sectional view illustrating forces that are applied in a direction perpendicular to the lower surface of the rocker shown in FIG. 3. If the floor panel 20 is displaced in a displacement direction D as shown in FIG. 8, the rocker compressing force Fc is applied in the vicinity of the corner portion, which is formed between the lower wall portion 1G and the side wall of the rocker inner 1A, in the direction perpendicular to the lower surface of the rocker by the floor in-plane tensile force Fp applied to the floor panel 20.

Moreover, as shown in FIG. 7, a reaction force Frr caused by friction is applied in the vicinity of the corner portion, which is formed between the lower wall portion 1G and the side wall of the rocker inner 1A, in the direction parallel to the lower surface of the rocker. Further, the shear direction-reaction force Fsr is applied in the vicinity of the bonding point 1H. In this embodiment, loads applied to the bonding point 1H are parallel to the shear direction as described above. Accordingly, it may be possible to improve the bonding strength between the rocker 1 and the floor panel 20.

Further, in this embodiment, the corner portion between the lower wall portion 1G and the side wall of the rocker inner 1A is positioned below the bonding point 1H. Accordingly, when the floor in-plane tensile force Fp is applied to the floor panel 20, the reaction force Frr is caused by friction between the floor panel 20 and the rocker 1 due to the rocker compressing force Fc applied to the corner portion. Therefore, it may be possible to distribute a load applied to the floor panel 20.

Figure 9:
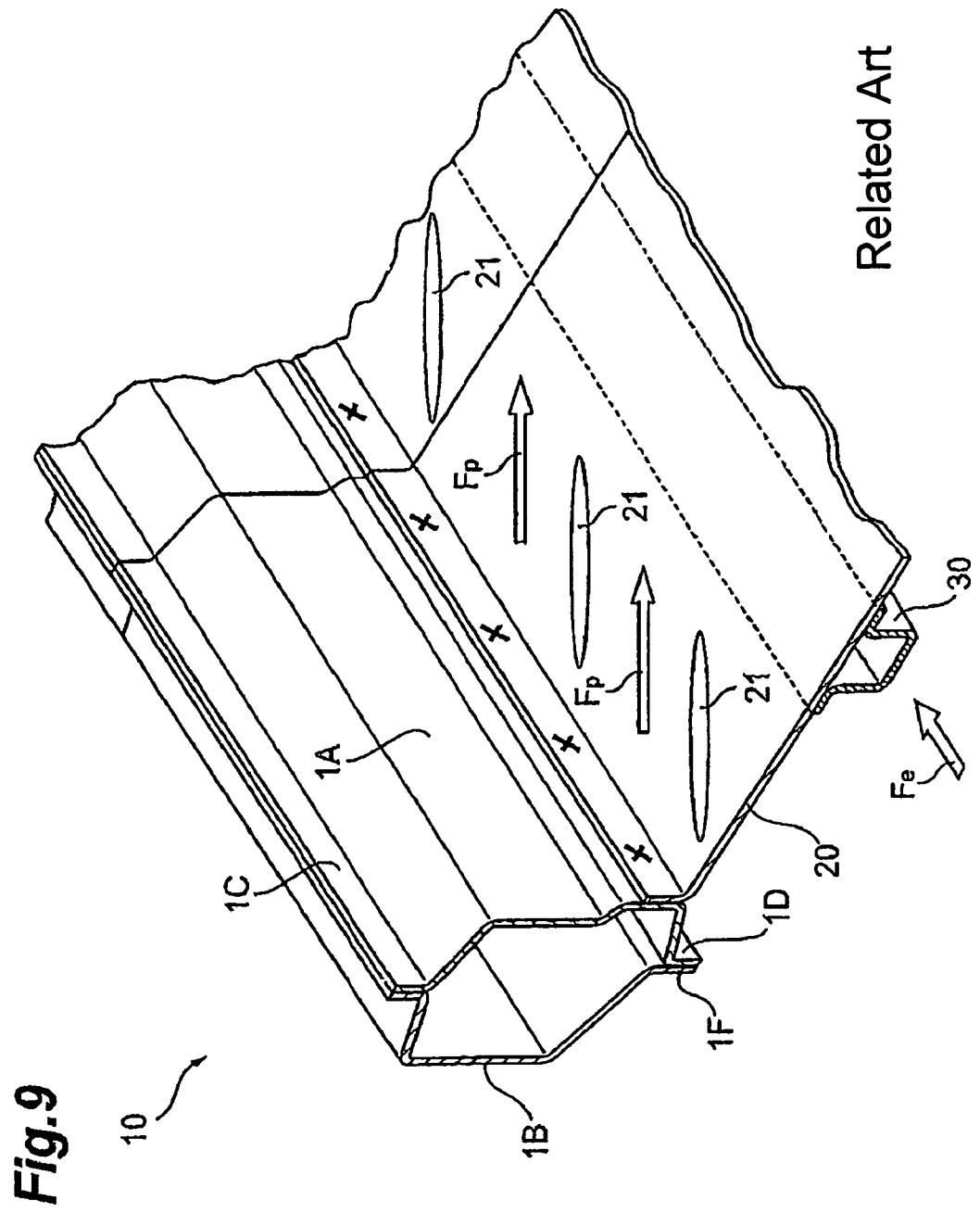
FIG. 9 is a perspective view illustrating the bonding between a floor panel and a rocker in the related art.
Figure 10:
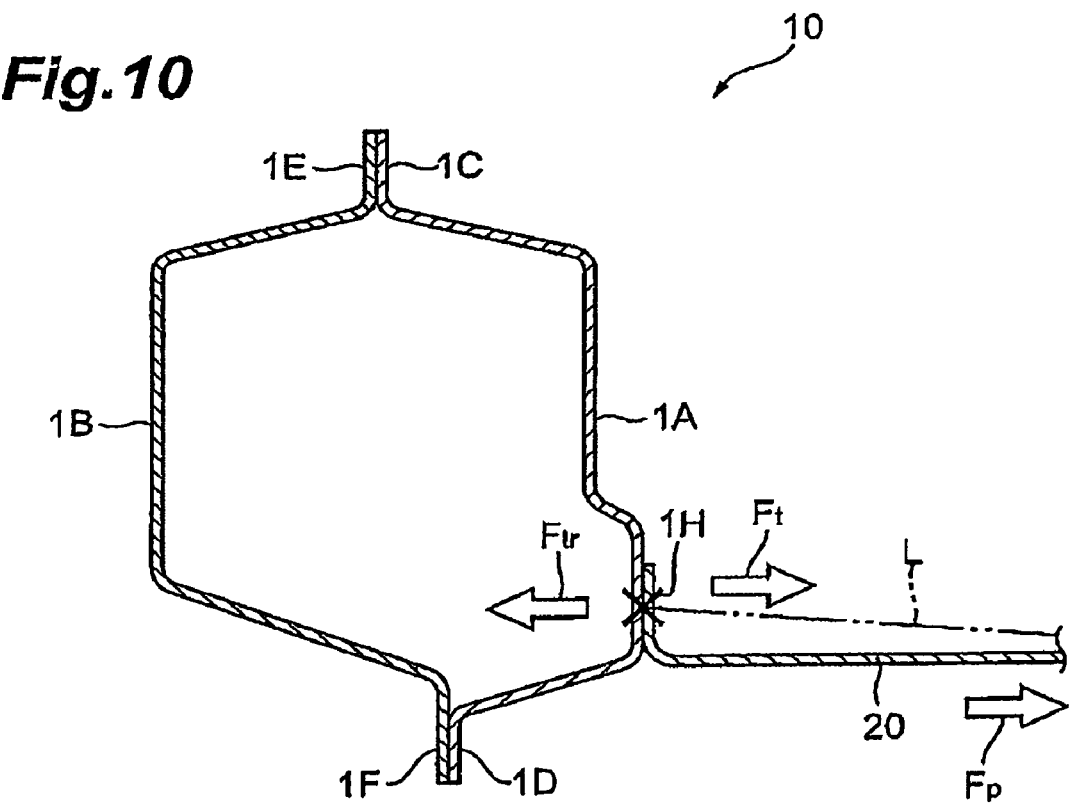
FIG. 10 is a longitudinal sectional view illustrating forces applied to the respective portions when an external force is applied to the rocker and the floor panel shown in FIG. 9.
Figure 11:
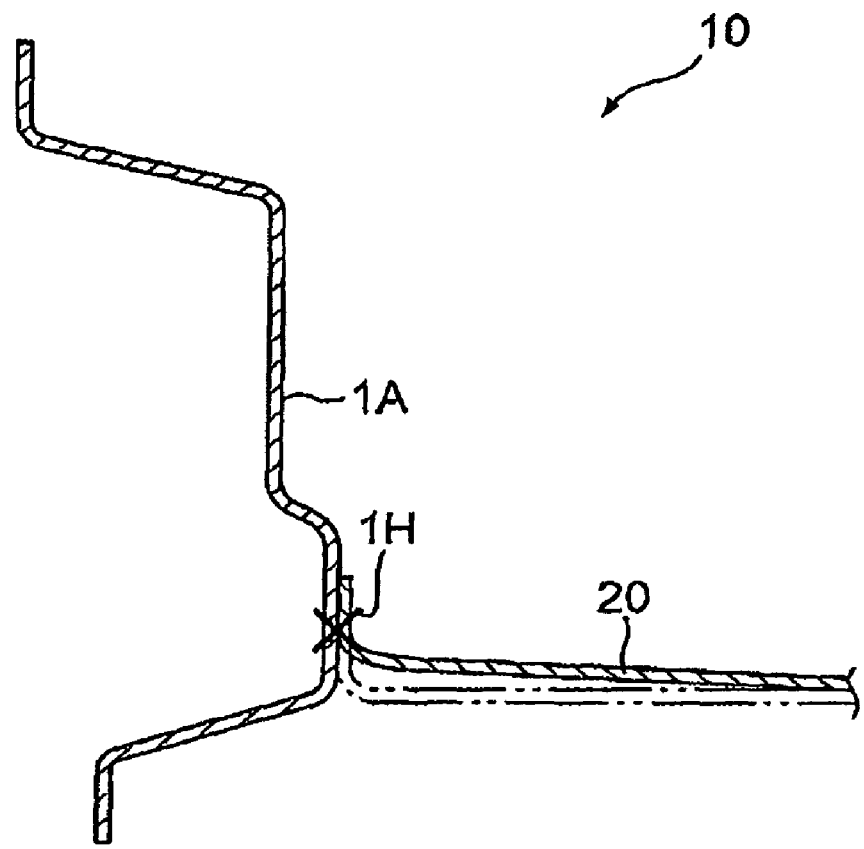
FIG. 11 is a longitudinal sectional view illustrating forces that are applied to the rocker and the floor panel shown in FIG. 9.

FIG. 9 is a perspective view illustrating the bonding between a floor panel and a rocker in the related art, FIG. 10 is a longitudinal sectional view illustrating forces applied to the respective portions when an external force is applied to the rocker and the floor panel shown in FIG. 9, and FIG. 11 is a longitudinal sectional view illustrating forces that are applied to the rocker and the floor panel shown in FIG. 9. When a floor in-plane tensile force Fp is applied to a floor panel 20 and wrinkles 21 or the like are formed in the structure where the floor panel 20 is bonded to the side wall of a rocker inner 1A as shown in FIG. 9 through a flange, a separation load Ft and a separation direction-reaction force Ftr are applied to a bonding point 1H if the floor panel 20 is deformed along a floor panel-deformation line L as shown in FIG. 10. In this case, if a bonding portion 1H between a floor and the rocker is formed on the side wall of the rocker inner 1A, the separation load and the separation direction-reaction force become separation direction-inputs with respect to the floor in-plane tensile force Fp. For this reason, there is a drawback in that sufficient bonding strength is not obtained as shown in FIG. 11.

Figure 12:
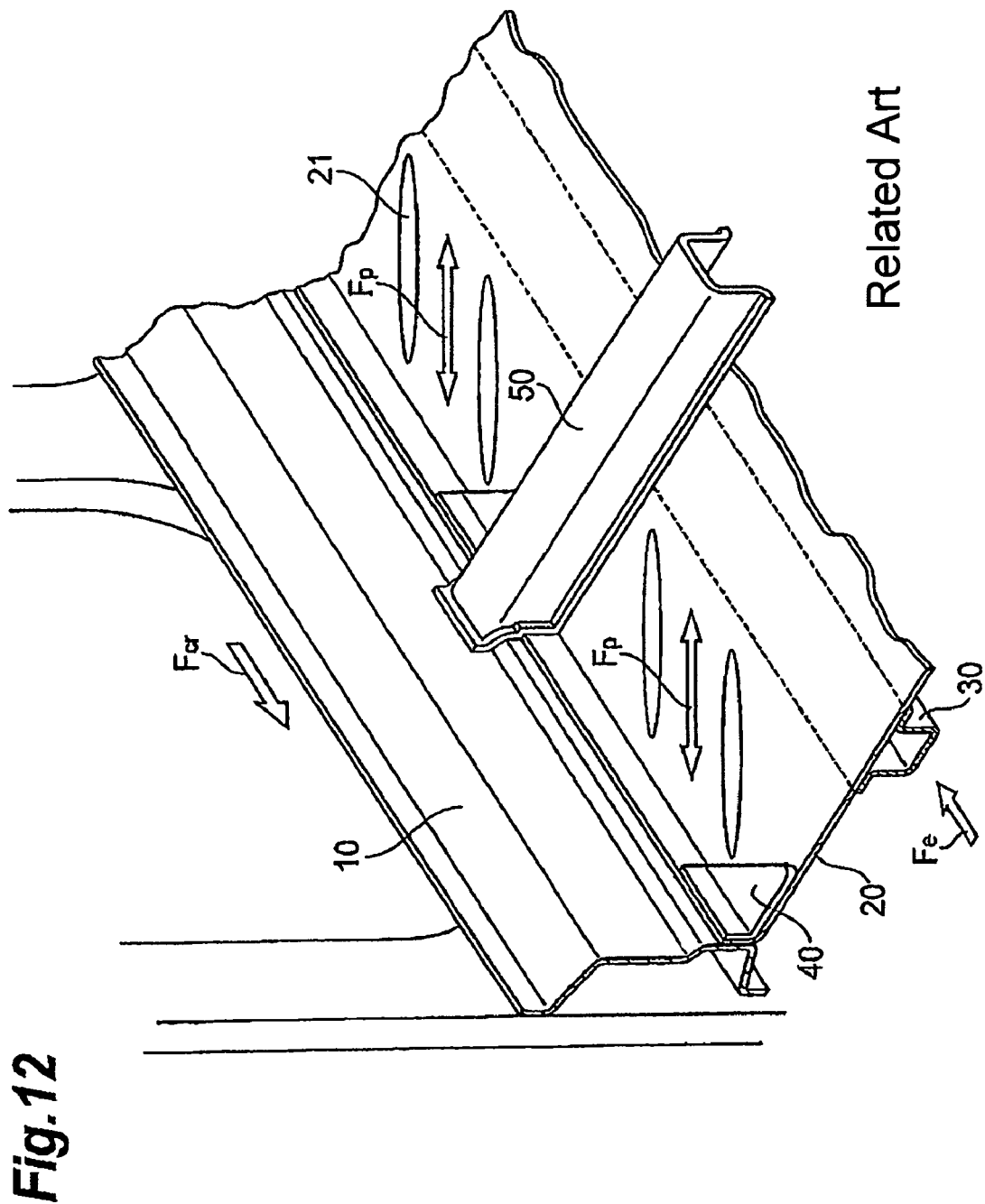
FIG. 12 is a perspective view illustrating reinforcing members and forces applied to the respective portions when an external force is applied to the rocker and the floor panel shown in FIG. 9.

FIG. 12 is a perspective view illustrating reinforcing members and forces applied to the respective portions when an external force is applied to the rocker and the floor panel shown in FIG. 9. A load input, which is input to a floor-under-reinforcement 30 in the longitudinal direction of the floor-under-reinforcement and becomes a floor input Fe, displaces the floor-under-reinforcement 30 to the rear side as shown in FIG. 12. In this case, an in-plane tensile force is applied to the floor panel 20 that bonds the floor-under-reinforcement 30 to the rocker 1 and front and rear loads of the floor-under-reinforcement 30 are transmitted to the rocker 1 by the tensile force, so that a rocker longitudinal direction-reaction force Fcr is applied to the rocker 1.

In this case, since a load is transmitted only through the bonding portion between the floor panel 20 and the rocker 1, the upper limit of a load capable of being transmitted is determined by the strength of the bonding portion. For this reason, the strength of the bonding portion between the lower panel 20 and the rocker 1 is very important. Meanwhile, since sufficient bonding strength is not obtained in the structure shown in FIG. 9, reinforcing members 40 and 50 for improving bonding strength are needed against the floor input Fe and the rocker longitudinal direction-reaction force Fcr. For this reason, an increase in weight and cost is caused.

Figure 13:
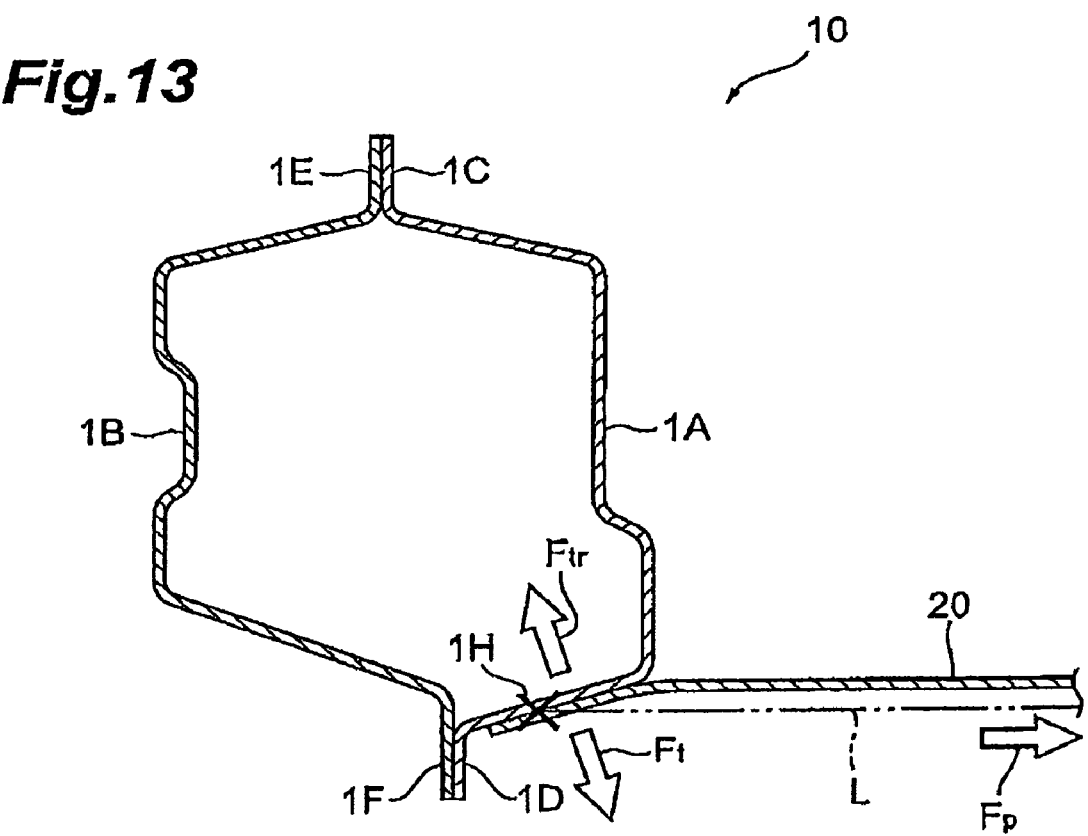
FIG. 13 is a perspective view illustrating another aspect of the bonding between the floor panel and the rocker in the related art.
Figure 14:
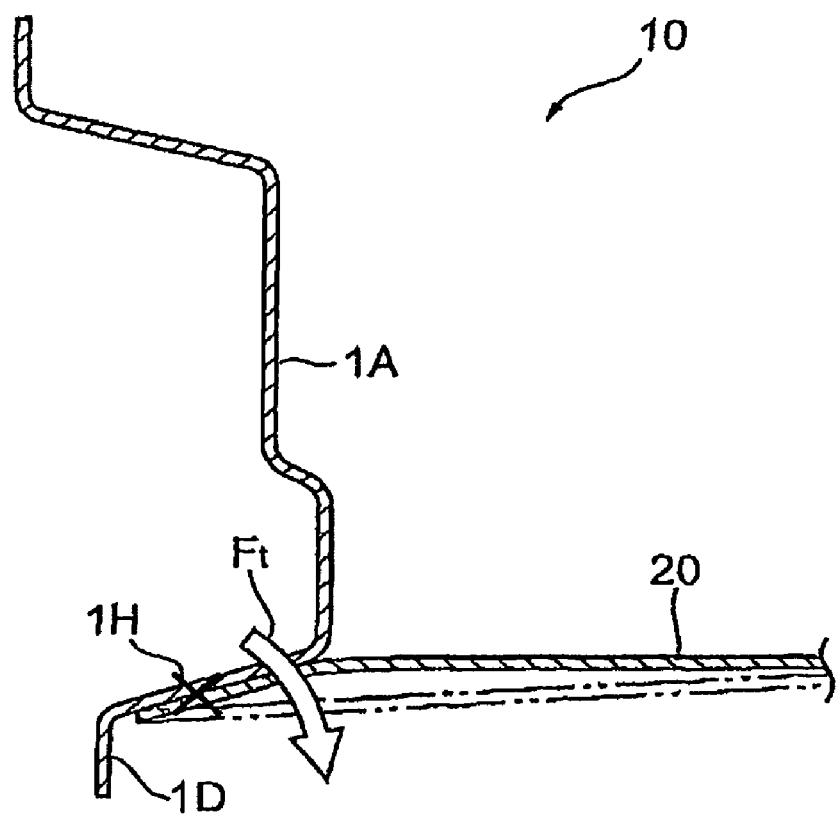
FIG. 14 is a longitudinal sectional view illustrating a force that is applied in a direction perpendicular to the lower surface of the rocker shown in FIG. 13.
Figure 15:
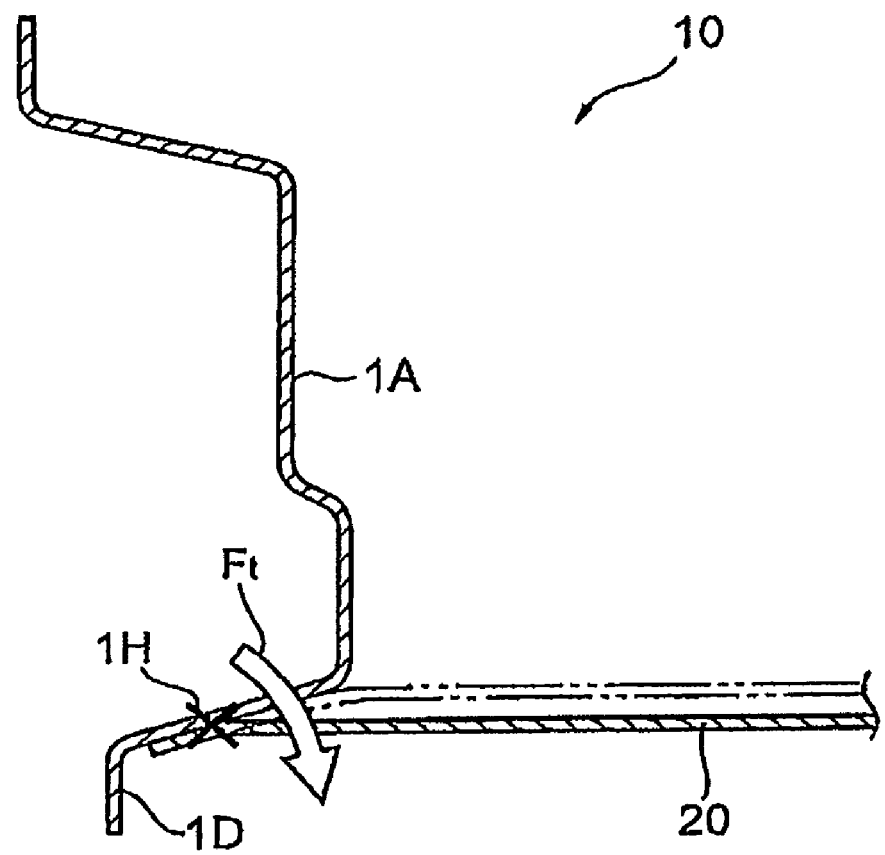
FIG. 15 is a longitudinal sectional view illustrating a force that is applied in a direction parallel to the lower surface of the rocker shown in FIG. 13.

FIG. 13 is a perspective view illustrating another aspect of the bonding between the floor panel 20 and the rocker 1 in the related art. If the lower surface of the rocker 1 is inclined upward toward the inside of a vehicle even though the floor panel 20 is bonded to the lower surface of the rocker 1 as shown in FIG. 13, a separation load Ft and a separation direction-reaction force Ftr are applied to a bonding point 1H when a floor in-plane tensile force Fp is applied to the floor panel 20 and the floor panel 20 is deformed along the floor panel-deformation line L. In this case, the floor panel 20 is separated and deformed as shown in FIG. 15 due to a separation load Ft generated as shown in FIG. 14. For this reason, there is a drawback in that sufficient bonding strength is not obtained.

Meanwhile, according to this embodiment, the rocker 1 includes a lower wall portion 1G, which is an inclined surface inclined downward toward the inside of the vehicle body, on the lower surface of the rocker 1. The floor panel 20 is bonded to the lower wall portion 1G. Accordingly, when an in-plane tensile force Fp is applied to the floor panel 20, the in-plane tensile force Fp is applied not in a direction where the bonding between the rocker 1 and the floor panel 20 is separated but in a direction where the bonding between the rocker and the floor panel is shorn. As a result, it may be possible to improve bonding strength.

Further, the rocker 1 includes a lower wall portion 1G, which is an inclined surface inclined downward toward the inside of the vehicle body, on the lower surface of the rocker 1, and the floor panel 20 is bonded to the inclined surface. Accordingly, a corner portion is formed at the end portion of the inclined surface facing the floor panel 20, and a frictional force is generated at the corner portion between the floor panel 20 and the rocker 1. Therefore, a load, which is applied to the floor panel 20, can be distributed to the rocker 1. Due to these operations, reinforcing members and the like do not need to be provided, and it may be possible to improve the bonding strength between the rocker 1 and the floor panel 20.

Furthermore, in this embodiment, the bonding point 1H between the floor panel 20 and the lower wall portion 1G, which is an inclined surface, is positioned above the end portion of the lower wall portion 1G facing the inside of the vehicle body. Accordingly, a load, which has been distributed to the rocker 1 due to a frictional force that is generated at the corner portion of the end portion of the lower wall portion 1G facing the floor panel 20, is applied to the bonding point 1H. Therefore, it may be possible to reduce the load to be applied to the bonding point 1H.

Figure 16:
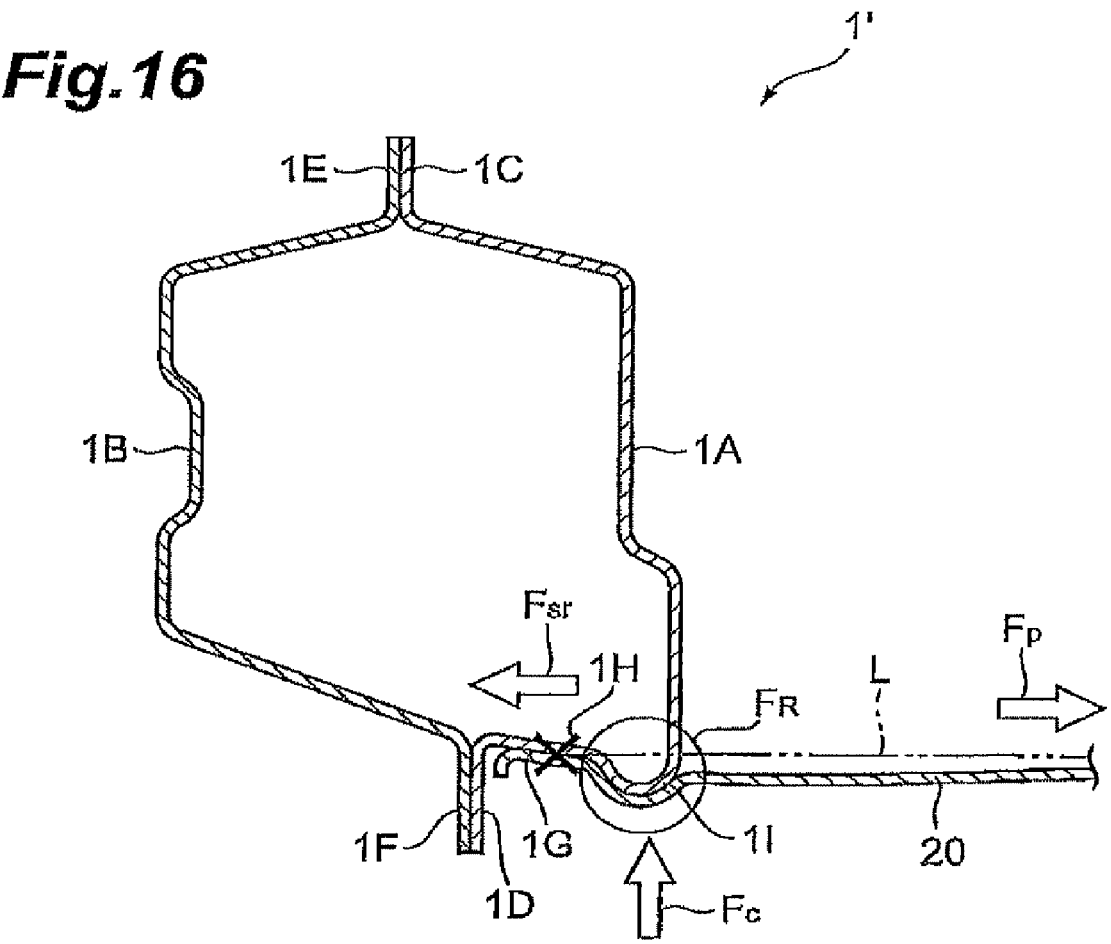
FIG. 16 is a longitudinal sectional view illustrating the bonding between a floor panel and a rocker according to a second embodiment.

A second embodiment of the invention will be described below. FIG. 16 is a longitudinal sectional view illustrating the bonding between a rocker and a floor panel according to a second embodiment. This embodiment is different from the first embodiment in that a protruding portion 1I is formed at an end portion of a lower wall portion 1G, which is an inclined surface inclined downward toward the inside of a vehicle body, facing a side wall of a rocker inner 1A, that is, at an end portion of the lower wall portion 1G facing the inside of the vehicle body as shown in FIG. 16.

The protruding portion 1I protrudes from the end portion of the lower wall portion 1G facing the inside of the vehicle body in the range of, for example, $1/13$ to $5/13$, more preferably, $2/13$ to $4/13$ of the length of the lower wall portion 1G in the width direction of the vehicle body, and protrudes from the wall surface of the lower wall portion 1G at a height of $1/50$ to $15/50$, more preferably, $2/50$ to $5/50$ of the length of the lower wall portion 1G in the width direction of the vehicle body.

According to this embodiment, the lower wall portion 1G, which forms an inclined surface, includes the protruding portion 1I protruding downward. Accordingly, a frictional force is generated at the protruding portion 1I between the floor panel 20 and the rocker 1, so that a load applied to the floor panel 20 can be further distributed to the rocker 1.

In particular, since the protruding portion 1I is positioned at a corner portion between the lower wall portion 1G and the side wall of the rocker inner 1A, it may be possible to generate a frictional force at the protruding portion 1I between the floor panel 20 and the rocker 1. Accordingly, it may be possible to improve the effect of distributing a load, which is applied to the floor panel 20, to the rocker 1.

The embodiments of the invention have been described above. However, the invention is not limited to the above-mentioned embodiments and may have various modifications.

INDUSTRIAL APPLICABILITY

The invention does not need to be provided with reinforcing members and the like, can improve the bonding strength between the rocker and the floor panel, and contributes to the reduction in weight and cost.

The invention claimed is:

1. A vehicle body side structure where a rocker extending in a longitudinal direction of a vehicle body is provided at a lower portion of the vehicle body and a floor panel is bonded to the rocker,
wherein the rocker includes an inclined surface, which is inclined downward toward the inside of the vehicle body, on the lower surface of the rocker,
the inclined surface includes a convex portion protruding downward from the inclined surface, and
the floor panel is bonded to the inclined surface and positioned below the inclined surface.

2. The vehicle body side structure according to claim 1, wherein a bonding point between the floor panel and the inclined surface is positioned above an end portion of the inclined surface facing the inside of the vehicle body.

3. The vehicle body side structure according to claim 1, wherein the convex portion is positioned at an end portion of the inclined surface facing the inside of the vehicle body.

4. The vehicle body side structure according to claim 2, wherein the convex portion is positioned at an end portion of the inclined surface facing the inside of the vehicle body.

5. A vehicle body side structure where a rocker extending in a longitudinal direction of a vehicle body is provided at a lower portion of the vehicle body and a floor panel is bonded to the rocker,
wherein the floor panel is bonded to the lower surface of the rocker and positioned below the rocker, and includes a bonding point between the rocker and the floor panel, a contact surface that comes into contact with the lower surface of the rocker on the inner side of the vehicle body than the bonding point, and a contact surface-terminal portion where the contact between the contact surface and the lower surface of the rocker is separated on the inner side of the vehicle body than the contact surface,
the contact surface includes a portion that is positioned below both the bonding point and the contact surface-terminal portion, and
the lower surface of the rocker includes a convex portion protruding downward from the lower surface of the rocker to the contact surface.

* * * * *